(12) United States Patent
Peschke et al.

(10) Patent No.: US 8,821,019 B2
(45) Date of Patent: Sep. 2, 2014

(54) SEAL FOR A HYDROSTATIC LINEAR GUIDE

(75) Inventors: Harald Peschke, Veitsbronn (DE); Wolfgang Bauer, Riegelsberg (DE); Thomas Gietl, Pegnitz (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 54 days.

(21) Appl. No.: 13/477,130

(22) Filed: May 22, 2012

(65) Prior Publication Data

US 2012/0230616 A1    Sep. 13, 2012

Related U.S. Application Data

(63) Continuation of application No. 12/135,471, filed on Jun. 9, 2008, now Pat. No. 8,337,084.

(30) Foreign Application Priority Data

Jul. 3, 2007 (DE) .............................. 102007030883

(51) Int. Cl.
*F16C 29/06* (2006.01)
*F16C 29/08* (2006.01)
*F16C 29/02* (2006.01)

(52) U.S. Cl.
CPC ............. *F16C 29/086* (2013.01); *F16C 29/088* (2013.01); *F16C 29/025* (2013.01)
USPC ............................................. 384/15; 384/12

(58) Field of Classification Search
USPC ........... 384/12, 15, 43, 45; 277/384, 404, 411
See application file for complete search history.

(56) References Cited

U.S. PATENT DOCUMENTS

| | | | |
|---|---|---|---|
| 3,499,690 A | | 3/1970 | Siebers |
| 3,929,340 A | * | 12/1975 | Peisker .......................... 277/559 |
| 4,789,166 A | | 12/1988 | Rericha et al. |
| 5,092,685 A | | 3/1992 | Tonogai |
| 5,102,235 A | | 4/1992 | Mugglestone |
| 5,340,219 A | * | 8/1994 | Agari ............................... 384/15 |
| 5,971,614 A | | 10/1999 | Kane et al. |
| 6,056,292 A | * | 5/2000 | Gerigk ........................... 277/549 |
| 6,113,272 A | * | 9/2000 | Michioka et al. ............... 384/15 |
| 6,644,856 B2 | | 11/2003 | Lasch |
| 6,857,780 B2 | | 2/2005 | Morr et al. |
| 6,860,486 B2 | * | 3/2005 | Hacker et al. .................. 277/553 |
| 7,287,906 B2 | * | 10/2007 | Wasson et al. ................... 384/12 |
| 2004/0042689 A1 | | 3/2004 | Wasson et al. |

* cited by examiner

*Primary Examiner* — William C Joyce
(74) *Attorney, Agent, or Firm* — Volpe and Koenig, P.C.

(57) ABSTRACT

A seal (1) for a hydrostatic linear guide with a given adjustment direction (5), with a longitudinal seal section (7, 7') extending essentially parallel to the adjustment direction (5), and with a transverse seal section (8, 8') extending essentially transverse to the adjustment direction (5), wherein a first lip seal with a projecting lip portion (12) extends along the longitudinal seal section and a second lip seal with a projecting lip portion (14) extends along the transverse seal section. A height of the projecting lip portion (12) of the first lip seal oscillates in a wave shape in the adjustment direction. With such a seal (1), both a high degree of static oil tightness and also a high degree of dynamic oil tightness are achieved for a hydrostatic linear guide.

12 Claims, 6 Drawing Sheets

SEAL FOR A HYDROSTATIC LINEAR GUIDE

CROSS-REFERENCE TO RELATED APPLICATIONS

This application is a continuation of U.S. application Ser. No. 12/135,471, filed Jun. 9, 2008, which claims the benefit of German Patent Application No. 102007030883.5, filed Jul. 3, 2007, both of which are incorporated herein by reference as if fully set forth.

FIELD OF THE INVENTION

The invention relates to a seal for a hydrostatic linear guide with a predetermined adjustment direction, with a longitudinal seal section extending essentially parallel to the adjustment direction and with a transverse seal section extending essentially perpendicular to the adjustment direction, wherein a first lip seal runs along the longitudinal seal section and a second lip seal runs along the transverse seal section, and wherein the longitudinal seal section and the transverse seal section are connected to each other.

BACKGROUND OF THE INVENTION

Such a seal for a hydrostatic linear guide is known, for example, from US 2004/0042689 A1. The seal proposed there is arranged for preventing undesired oil discharge at the edge of a carrier body, which is supported hydrostatically and which moves in a line relative to a guide rail along a predetermined adjustment direction. For the hydrostatic support, oil is pumped via supply lines into pockets of the carrier body and is pressed against the guide rail for forming a sliding film. Via suitable return flow channels, the oil is discharged and pumped back into the pockets in a cycling process. The seal arranged at the edge of the carrier body comprises lip seals, in order to prevent unnecessary leakage of the oil when the carrier body is moved relative to the guide rail. For this purpose, a longitudinal seal section with a first lip seal with a lip portion extending in the adjustment direction is arranged on each longitudinal side of the carrier body running parallel to the adjustment direction and a transverse seal section with a second lip seal with a lip portion extending perpendicular to the adjustment direction is arranged on each transverse edge or transverse side of the carrier body. The longitudinal seal sections and the transverse seal sections are here connected to each other, in particular, by receptacle areas.

For a hydrostatic linear guide to function with a carrier body sliding on a sliding film relative to a guide rail, the seal that is used must create a certain degree of dynamic oil tightness, so that overall oil loss is prevented as much as possible. When the system is at a standstill, the seal should be closed oil-tight as much as possible toward the outside relative to the guide rail.

SUMMARY

The object of the invention is to provide a seal of the type named above for a hydrostatic linear guide, which is improved with respect to oil tightness relative to the known constructions of the state of the art.

This objective is met according to the invention for a seal of the type noted above in that the first lip seal and the second lip seal merge into each other with a constant curvature.

Here, in a first step the invention starts from the idea that, in particular, transition positions between the longitudinal seal section and the transverse seal section are problematic for a dynamic oil seal. In operation of the system, namely due to the movement of the carrier body relative to the guide rail on the lip seals, some oil always escapes, which, however, is held in the system for an opposite movement. Such a seal, however, is problematic at the abutting positions between a longitudinal seal section and a transverse seal section.

For seals used previously, the lip seals of the longitudinal seal section and the transverse seal section abut each other in the corner regions. In other words, one lip seal ends at the position that it meets the other lip seal running perpendicular to the first lip seal. Oil discharged at an angle to the adjustment direction in a corner region thus no longer can be led sufficiently back into the system due to the one-dimensional movement of the carrier body relative to the guide rail.

Now, in another step, the invention recognizes that this problem can be avoided if the first lip seal and the second lip seal merge into each other with a constant curvature. In this way, first a problematic corner region, at which some leakage can occur when the carrier body moves relative to the guide rail, is avoided. Instead, a peripheral sealing edge is created, wherein possible leakage points caused by the movement are avoided due to the constant curvature. Oil is reliably held back. With this construction, however, oil escaping in the corner region can also be returned into the system for an opposite motion.

Overall, this construction achieves an improved degree of dynamic oil tightness relative to the state of the art. The oil tightness at standstill is also increased by the peripheral sealing edge.

Here, the term "curvature" is understood to be the change in direction of the lip seals per unit of length or, in other words, the first derivative of the curve given by the lip seals relative to a straight line.

The seal itself can have several longitudinal seal sections and several transverse seal sections and can form, in particular, a closed shape overall. The seal can be produced as a whole or from individual parts, which are then assembled to form the seal. Suitable materials for the seal are, in principle, elastic materials, such as rubber or the like, and especially elastomers, thermoplastics, or thermoplastic elastomers. In particular, a nitrile-butadiene rubber (NBR), an acrylate rubber (ACM), a fluorine rubber (FKM), or an ethylene-propylene-diene monomer (EPDM) can be used. In principle, a polyamide is also possible. Such plastics can be produced or processed easily, for example, by injection molding or by extrusion.

With respect to the merging region between the first lip seal and the second lip seal, all that is required by the invention is that this region must have a constant curvature. In this respect, various and especially also wave-shaped profiles are possible, as long as the curvature does not change in value abruptly and thus discontinuously in the corner region between the longitudinal seal section and the transverse seal section.

Advantageously, because it can be produced easily, the first lip seal and the second lip seal merge into each other by means of an arc. In particular, the arc can be a circular arc, so that the curvature area has a constant curvature along the curve. In this way, the corner region between the longitudinal seal section and the transverse seal section has a uniform construction, which produces a further improvement with respect to oil tightness.

In another advantageous construction, the transverse seal section comprises a third lip seal, which runs essentially parallel to the second lip seal. The transverse sealing section consequently has a double-lip construction. Through this construction, a separation of the functions can be realized in such a way that the second lip seal takes over the function of sealing the oil, while the third lip seal has the function of separating dirt, dust, or particles and thus prevents dirt or dust particles from getting into the interior of the carrier body and thus endangering the functionality of the linear guide. For this purpose, it is provided, in particular that the third lip seal is connected in front of the second lip seal viewed from the outside in the direction toward the interior of the carrier body. In particular, the profiles of the second and the third lip seal can be differentiated from each other due to the various functionalities.

Preferably, the first lip seal running along the longitudinal seal section is constructed in such a way that its height, i.e., its extent essentially perpendicular to the substrate, oscillates like a wave along the adjustment direction. Through such a construction, for the longitudinal seal section, an optimum between oil tightness, friction, and wear is achieved. Through the number of wave trains along the longitudinal seal section, the desired properties can be adapted or set according to the requirements and the design of the hydrostatic linear guide. Through the use of the wave-shaped construction, the lip seal forms a surface-area contact on the guide rail, by which the tightness relative to a contact edge is improved.

In a preferred construction, the height of the first lip seal oscillates like a sine wave along the adjustment direction. In this way, a uniformly repeating contact surface on the lip seal is created along the longitudinal seal section.

The described, wave-shaped construction of the height of the lip seal, in particular, a lip seal of a longitudinal seal section, is also a stand-alone inventive idea. Such a construction improves the dynamic oil tightness relative to a straight edge seal due to the surface area-shaped contact and, in the case of a construction along a longitudinal seal section, due to the wave-shaped profile along the direction of movement, especially for a hydrostatic linear guide. Due to the wave-shaped profile along the adjustment direction, oil escaping at a wave train during operation is returned back into the system by the next wave train.

In another advantageous construction, the first and/or the second lip seal have a profile with an end that extends to a point transverse to its longitudinal direction. By forming a tip at the outer edge of each lip seal, its contact pressure relative to the guide rail is increased, which is advantageous, in turn, with respect to the tightness. Here, the tip does not necessarily have to have a symmetric profile, but instead can have an asymmetric construction for a pumping effect and thus for an improvement of the dynamic oil tightness.

For a continuous and uniform merging at the first lip seal, preferably a uniform profile for the first and the second lip seal is provided. However, it is just as easy to imagine that the profiles of the first and the second lip seals differ from each other. In this case, the different profiles of the first and second lip seals merge gradually and continuously in the merging region, so that none of the abrupt changes that reduce oil tightness occur there.

To further increase the contact pressure of the lip seals, preferably the first and/or the second lip seals are made from a material that exhibits an increased stiffness relative to the other sealing material. This can be realized, for example, by an adaptation of the plastic that is used with respect to its composition or in such a way that, in particular, the lip seals are reinforced with a carrier material, in particular, with a metal or a plastic. In both cases, the lip seals are reinforced relative to the other material of the seal, by which an improvement both of the dynamic and also the static oil tightness can be achieved within a certain framework.

The seal as such can be bonded, in principle, on the carrier body, injection molded on this body, or cross-linked, in particular, vulcanized, with this body in the manufacturing process. For increasing the function reliability, however, the longitudinal seal section and/or the transverse seal section comprise additional means for a positive and/or non-positive fit connection to a component of the linear guide, such as, in particular, on a carrier body. This can be, for example, recesses, grooves, or connecting pieces, which interact with elements of the component of the linear guide with corresponding, complementary constructions. In particular, the seal can comprise means for a clip connection.

As mentioned, the seal can have a one-piece construction or can be assembled from several individual parts. In a preferred construction, the seal has a multiple-part construction, wherein the individual parts are connected rigidly to each other, in particular, cross-linked, at an abutting edge. In principle, the abutting edges can also be bonded to each other, but cross-linking and especially vulcanization is provided, because the latter represents a connection with a higher level of oil tightness. Also, high requirements with respect to oil resistance and oil tightness are to be placed on a suitable adhesive. Furthermore, the adhesive should have, as much as possible, the same elasticity after curing as the sealing material bonded to it. Also, the cross-linking can be performed directly in a tool, for example, under a pressure and/or temperature effect, by which a secure joint of the individual parts is realized, without the risk of displacement, which would have a disadvantageous effect, in turn, in terms of oil tightness.

For a secure and durable joining of the individual parts, whether realized by adhesion or by cross-linking, it is favorable when the abutting edges each run at an angle relative to the longitudinal direction of the lip seals or have a step-shaped construction. Both measures increase the joint surface, so that the overall connection is improved. In particular, through such a construction, manufacturing tolerances can be compensated.

In another preferred construction, the abutting edges between the individual parts are each arranged in the longitudinal seal section. In this way it is taken into consideration that the attachment of abutting edges directly in the corner regions between a longitudinal seal section and a transverse seal section is problematic both in terms of oil tightness and also in terms of service life of the connection. The fact that a tool for the injection molding of a longitudinal seal section with the merging in the transverse seal section is normally more complicated and therefore more cost-intensive than a tool for the injection molding of a transverse seal section that has the merging or the corner region in or at the longitudinal seal section, further speaks for an attachment of the abutting edges in a longitudinal seal section relative to an attachment in a transverse seal section. Normally, it is sufficient namely to provide the longitudinal seal section with an individual lip seal, while the transverse seal section is advantageously equipped with two parallel lip seals. In the case of providing an abutting edge in a transverse sealing section, the tool for producing the longitudinal sealing section must be equipped accordingly to form the beginning of a second lip seal in the merging region. Conversely, the second lip seal extends completely in a merging region, which is comprised by a transverse seal section, which is easier to realize in injection technology.

In this respect, it is more economical and easier in terms of production when the transverse seal section, including a predominant region of the constant curvature, is produced as an individual part. The cross-linking or adhesion or, in general, the joining of the longitudinal seal section, can then also be performed in the tool itself.

In one preferred improvement, a fourth lip seal is comprised by the seal for sealing relative to a component of the linear guide in the installed state, i.e., in particular, relative to the carrier body. This then extends advantageously at the inner edge of the seal relative to the component of the linear guide, on which the seal is mounted.

In a preferred construction, the seal on the peripheral edge of the recess of a carrier body is arranged for a hydrostatic linear guide, wherein the central recess of the carrier body is constructed for holding a longitudinal or guide rail.

BRIEF DESCRIPTION OF THE DRAWING

Embodiments of the invention will be explained in more detail with reference to a drawing. Shown herein are.

DETAILED DESCRIPTION OF THE PREFERRED EMBODIMENTS

Figure 1:
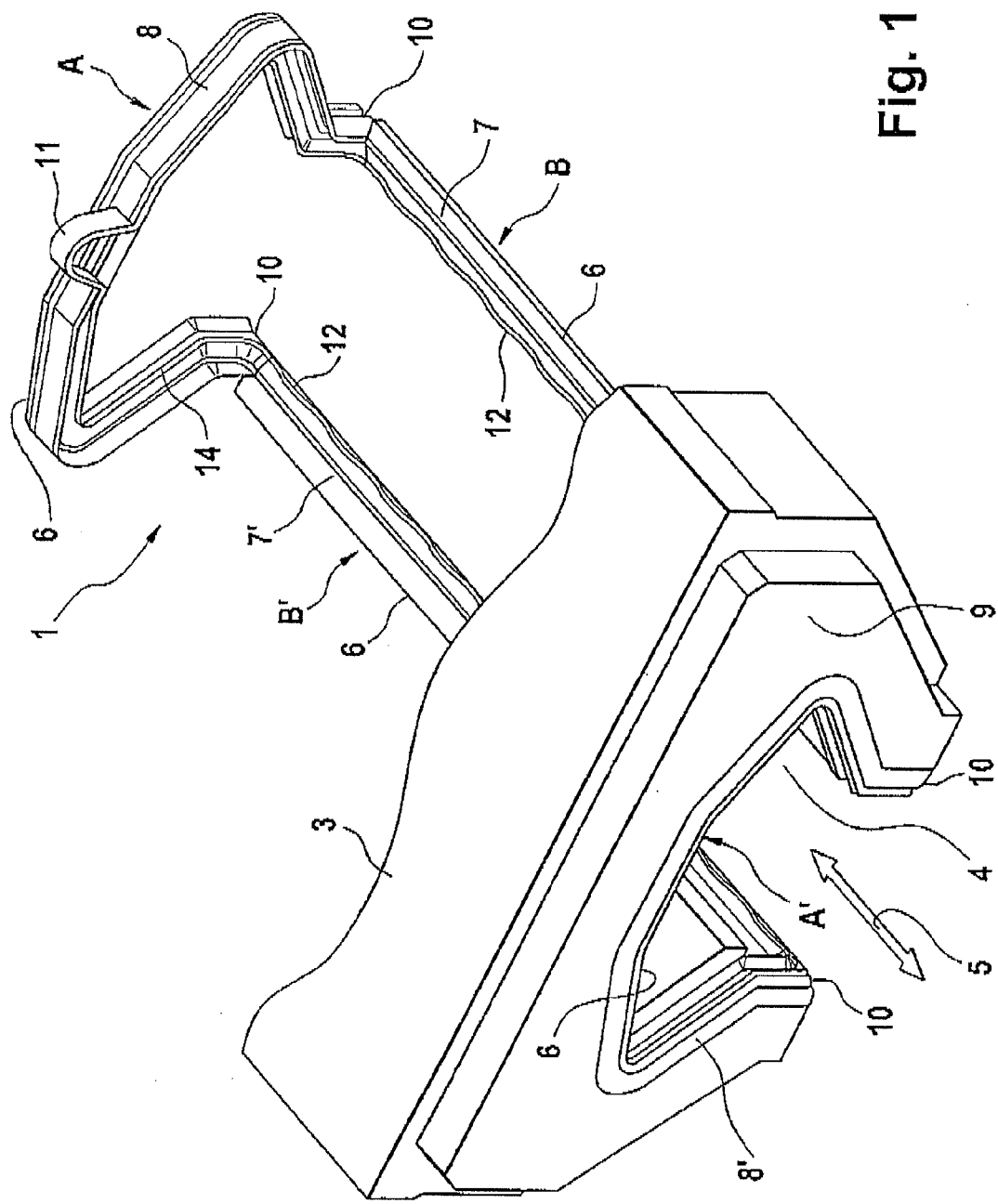
FIG. 1 is a perspective and partially transparent view of a peripheral seal arranged on a carrier body of a hydrostatic linear guide with a longitudinal seal section and a transverse seal section.

In FIG. 1, in a perspective and partially transparent representation, a peripheral seal 1 is shown, which is attached to a carrier body 3 of a hydrostatic linear guide. The carrier body 3 has a central recess 4, which is used for holding a not-shown guide rail. The carrier body 3 further has, on its inside, a number of oil pockets (not shown here), into which oil is pumped via corresponding supply lines. Through a corresponding surface construction, the oil escapes from the pockets and forms a sliding film on the inside relative to the guide rail guided in the recess 4, so that the carrier body 3 can move in the linear direction and is supported hydrostatically relative to the guide rail along the drawn adjustment direction 5. The carrier body 3 and the not-shown guide rail together form a so-called hydrostatic linear guide.

The one-piece and similarly peripheral seal 1 is guided along the peripheral edge 6 of the central recess 4 of the carrier body 3. Here, the seal 1 is attached to the carrier body 3 with a positive fit by connecting pieces and grooves. In addition, a clip connection or a bond, as well as cross-linking of the seal 1 can be provided relative to the carrier body 3. The carrier body 3 is usually made from a metal. Cross-linking is here performed by a bonding agent.

The peripheral seal 1 overall comprises two longitudinal seal sections 7 and 7', which extend parallel to the adjustment direction 5 at the longitudinal edges of the carrier body 3 facing the recess 4 or the guide rail, and two transverse seal sections 8 and 8', which run essentially transverse to the adjustment direction 5 and which seal the edges of the carrier body 3 extending transverse to the adjustment direction 5 relative to the guide rail. The longitudinal seal sections 7 and 7' each merge at corner regions 10 into the transverse seal sections 8 and 8'. The transverse seal sections 8 and 8' are here mounted on a carrier plate 9, which is screwed, in turn, to the actual carrier body 3. The carrier plate 9 can be made either from a plastic or from a metal. An arc-shaped sealing zone 11, which is used for sealing a recess in the carrier plate 9 used for oil return, is located on the upper sides of the two transverse seal sections 8 and 8' according to FIG. 1. Through the use of another inner lip seal relative to the carrier body 3, oil escaping via the oil pockets and flowing via the sliding zone is led to the sealing zone 11 and extracted there. The extracted oil is then pumped into the oil pockets again, so that overall an oil circuit is given.

In addition, in FIG. 1 a first lip seal 12 is seen, which extends along the two longitudinal seal sections 7 and 7' and which has a wave-shaped construction. From FIG. 1, a second lip seal 14 is also visible, which extends along the two transverse seal sections 8 and 8'. In the corner regions 10, the first lip seal 12 and the second lip seal 14 each merge into each other with a constant curvature. Therefore, overall, the uniform sealing edge, which surrounds the edge 6 of the recess 4 and which causes, at standstill, a static oil tightness and, during operation, a dynamic oil tightness of the carrier body 3 relative to the guide rail, is produced.

Parts of the longitudinal seal sections 7 and 7', the transverse seal sections 8 and 8', as well as the first lip seal 12 and second lip seal 14 running along these sections can be taken from the other figures. In particular, the seal 1 is made from four individual parts A, A', B, and B', wherein the four individual parts A, A', B, and B' are formed essentially by the two longitudinal seal sections 7 and 7', as well as by the two transverse seal sections 8 and 8'. The abutting edges between the individual parts A, A', B, and B' are located, however, not in the corner regions 10, but instead in the region of the longitudinal seal sections 7 and 7'. This is seen in FIG. 1 at the transverse lines drawn there. The transverse seal sections 8 and 8', including the associated corner regions 10, are each formed as an individual part A and A', respectively. The other individual parts B and B' connecting the individual parts A and A' essentially comprise the two longitudinal seal sections 7 and 7', respectively. Overall, the seal 1 is made from a thermoplastic elastomer or an elastomer by an injection molding process. Furthermore, the individual parts A, A', B, and B' are already connected to each other rigidly by cross-linking and, in particular, by vulcanization, in the tool.

Figure 2:
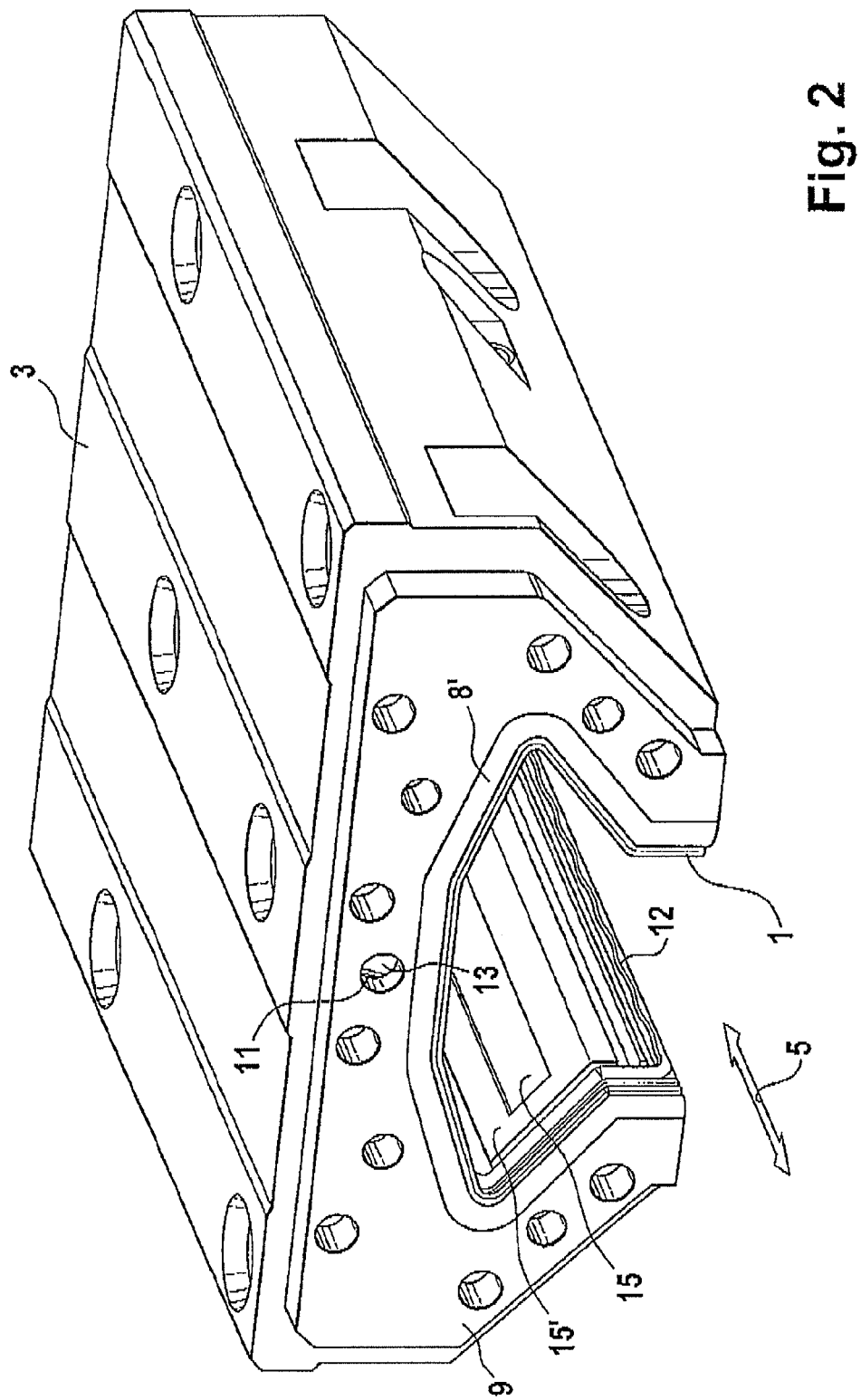
FIG. 2 is a perspective view of the carrier body of a hydrostatic linear guide with a peripheral seal mounted on this carrier body.

In FIG. 2, the carrier body 3 of the hydrostatic linear guide is shown with several details. The carrier plate 9, which holds the transverse seal section 8 of the peripheral seal 1, is now seen clearly. At the upper end of the carrier plate 9, in the middle, an oil return opening 13 is shown. By this oil return opening 13, oil escaping from the sliding zone is extracted by the inner, arc-shaped sealing zone 11. In the interior of the carrier body 3, an oil pocket 15 is visible. The oil pocket 15 is surrounded by a surface region 15', which forms a small gap dimension against the not-shown guide rail. On the surface region 15', a sliding zone is formed by the oil escaping under pressure from the oil pocket 15, so that the carrier body 3 can slide on the guide rail. Oil escaping from the sliding zone 15' against the transverse seal section 8 is collected by an additional inner lip seal and is extracted from the arc-shaped sealing zone 11 by the oil return opening 13.

Figure 3:
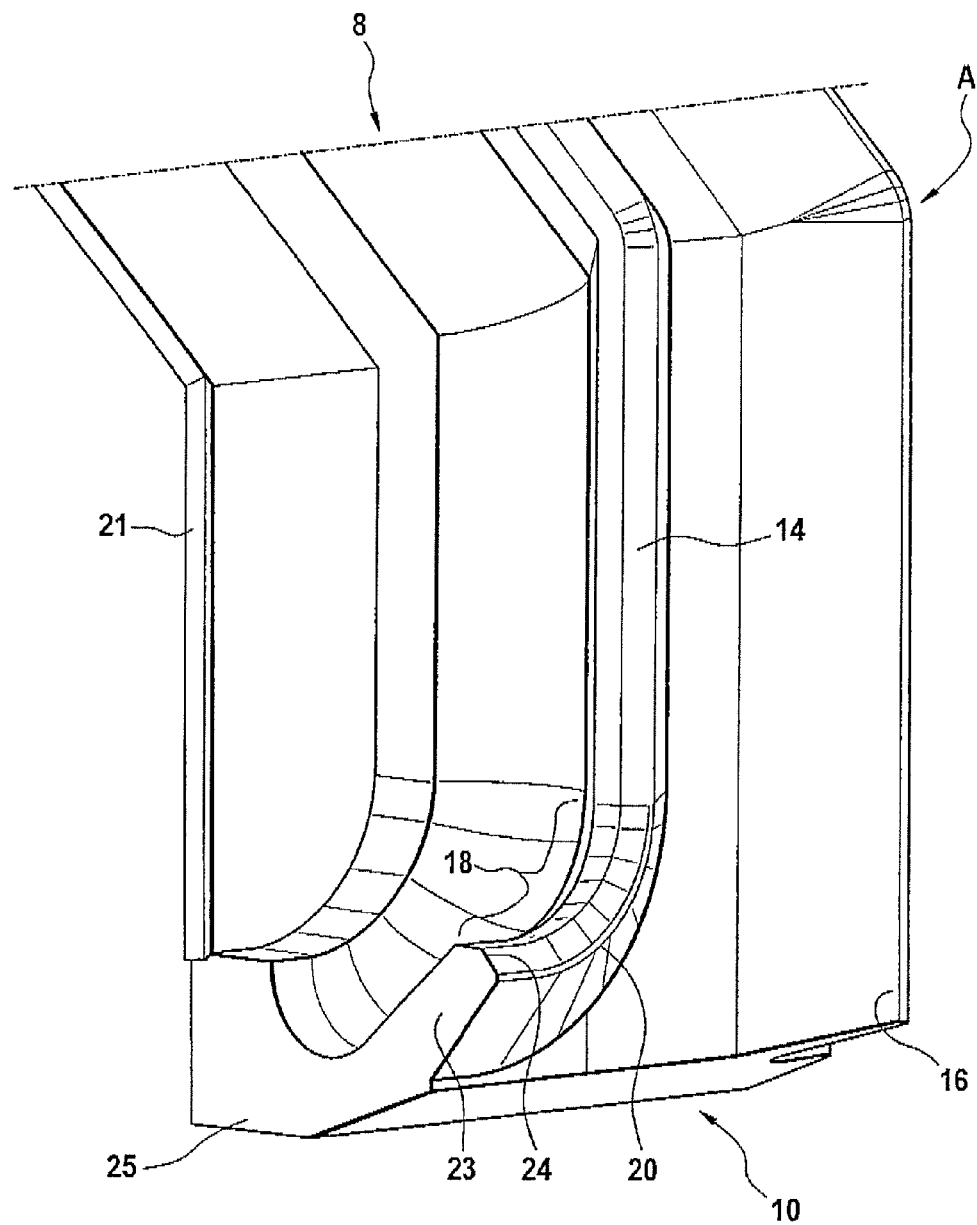
FIG. 3 is a perspective partial view of a cutout of the transverse seal section of the seal according to FIG. 1.

FIG. 3 shows, in a partial view and in perspective, a cutout of the transverse seal section 8, including a lower corner region 10 formed at the same time for merging into the longitudinal seal section 7'. In other words, a cutout of the individual part A according to FIG. 1 is shown. Now one clearly sees the inner second lip seal 14, which is provided for sealing oil relative to the guide rail transverse to the adjustment direction 5. Furthermore, the transverse seal section 8 comprises a third lip seal 16, which extends parallel to the second lip seal 14 and which is formed for separating the dirt or particles relative to the guide rail.

The inner, second lip seal 14 merges in the corner region 10 into a region of constant curvature 18. The region of constant curvature 18 is here formed as an arc 20. On the inner edge of the transverse seal section 8, there is, furthermore, a fourth lip seal 21, which is used as a secondary seal for sealing oil relative to the carrier body 3.

At the lower end of the arc 20 of the second lip seal 14, the profile 23 of this lip seal 14 can be seen perpendicular to its profile. The profile shows at the upper end a tip 24, by which the contact pressure of the second lip seal 14 increases relative to the guide rail. For amplifying the contact pressure, the second lip seal 14 is further increased overall by an adaptation of the material composition in its stiffness relative to the other material of the seal 1. Alternatively, reinforcement with metal is used.

Furthermore, on the left, lower end of the shown transverse seal section 8, i.e., at the end of the corner region 10, an abutting edge 25 extending at an angle can be seen, which is formed for connecting to a longitudinal seal section 7 or 7'.

Figure 4:
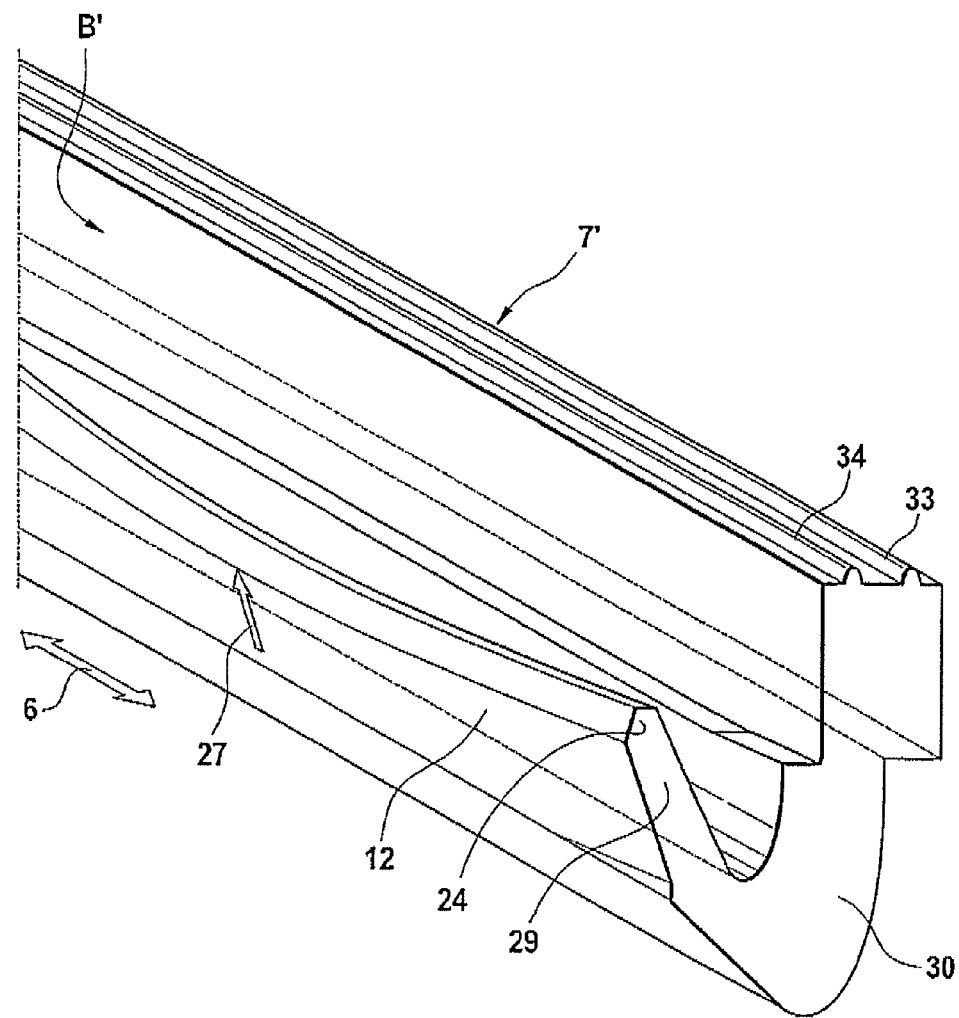
FIG. 4 is a perspective partial view of a cutout of the longitudinal seal section of the seal according to FIG. 1.

In FIG. 4, in a perspective partial view, a cutout of the longitudinal seal section 7' is shown, in turn, as it is bonded to the abutting edge 25 of the transverse seal section 8 according to FIG. 3. In other words, a cutout of the individual part B' is shown. On the inner edge of the longitudinal seal section 7', the first lip seal 12 is shown, which extends parallel to the adjustment direction 5. Now one clearly sees that the height 27 of the first lip seal 12 oscillates like a wave along the adjustment direction 5. In the profile 29 of the first lip seal 12, it becomes clear, in turn, that the first lip seal 12 also ends in a tip 24.

On the right lower end of the longitudinal seal section 7', there is, in turn, an abutting edge 30 running at an angle, which is provided for joining at the abutting edge 25 of the corner region 10 produced together with the transverse seal section 8 according to FIG. 3.

Along the upper edge of the longitudinal seal section 7' according to FIG. 4, there are two connecting pieces 33 and 34, which are used for the positive-fit connection of the longitudinal seal section 7' on the carrier body 3.

Figure 5:
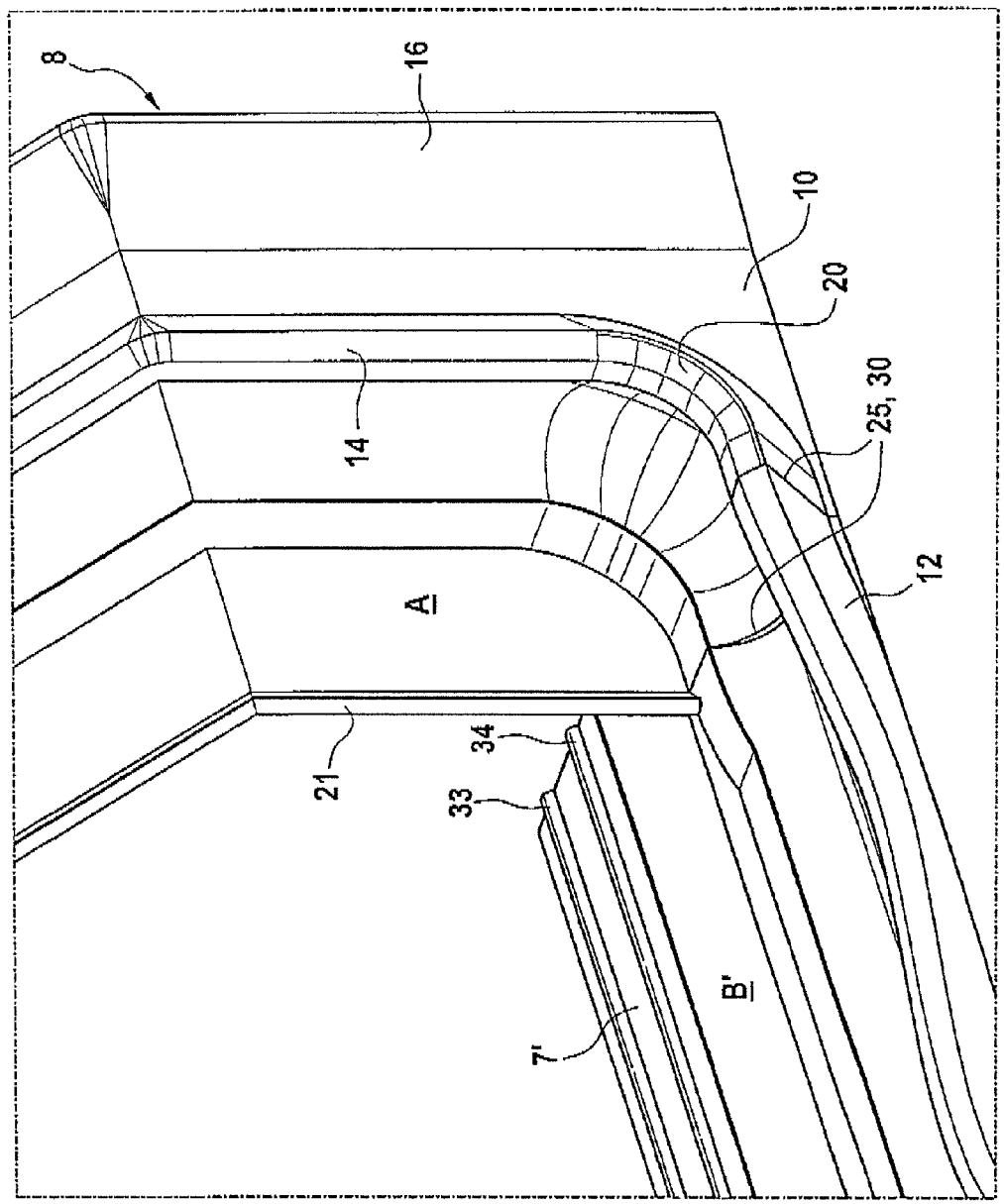
FIG. 5 is a perspective partial view of the joint region between a longitudinal seal section and a transverse seal section of the seal according to FIG. 1.

In FIG. 5, the individual parts shown in FIGS. 3 and 4 are now shown in the joined position. Here, the longitudinal seal section 7' is connected by cross-linking at the abutting edges 25 and 30 with the corner region 10 produced together with the transverse seal section 8. It is now visible that the second lip seal 14 merges through a region of constant curvature 18, namely by an arc 20, into the first lip seal 12. By cross-linking of the abutting edges 25 and 30 in the tool, a lateral displacement of these abutting edges 25 and 30 relative to each other is prevented, by which, overall a smooth and continuous merging of the two individual parts A and B' into each other is produced.

Due to the connected and peripheral sealing edge made from the first lip seal 12, arc 20, and second lip seal 14, reliable static and dynamic oil sealing of the inside of the carrier body 3 relative to the guide rail is achieved.

From FIG. 5, once again the position of the fourth lip seal 21 provided for secondary sealing relative to the carrier body 3 and the profile of the two connecting pieces 33 and 34 are visible.

Figure 6:
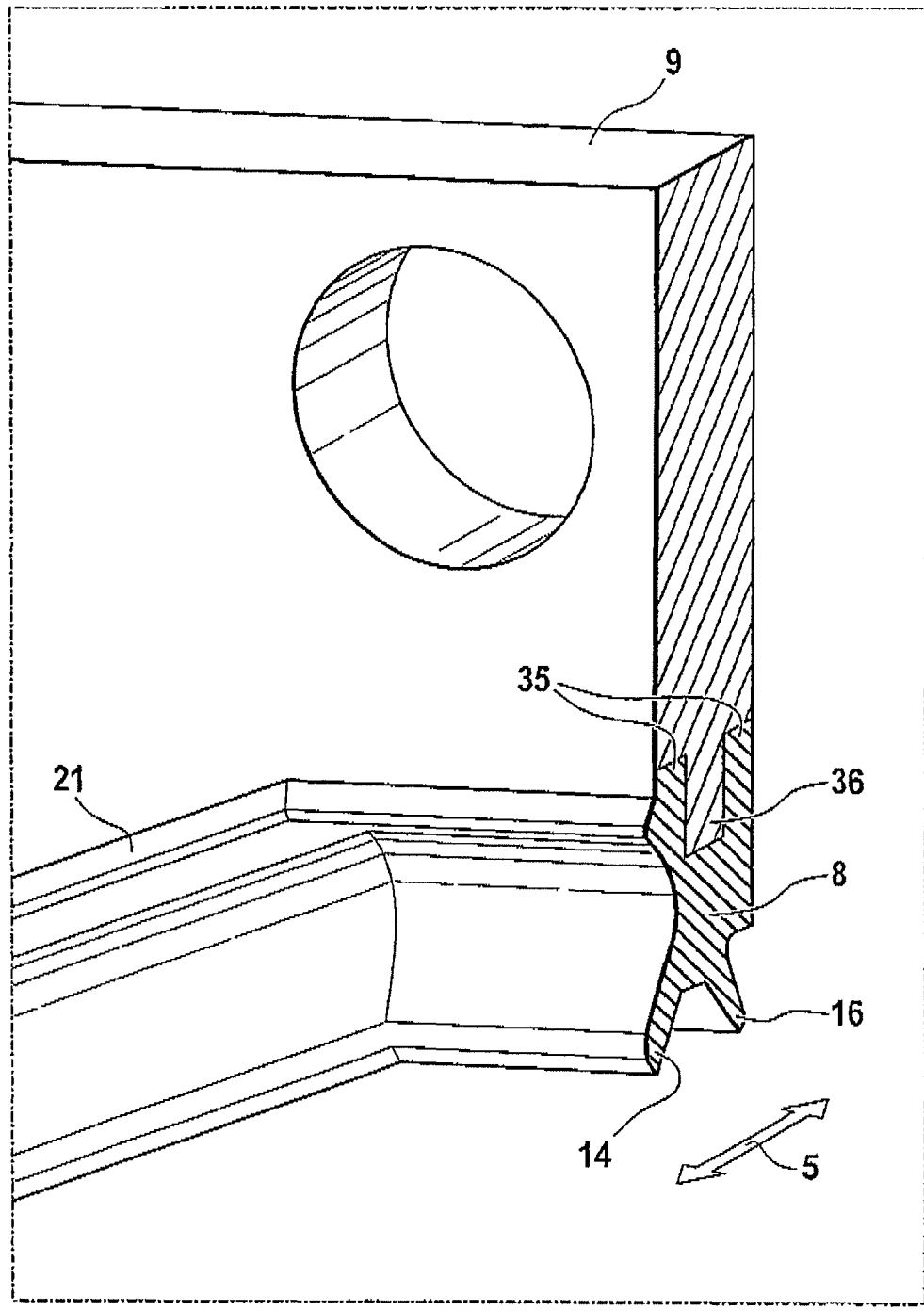
FIG. 6 is a perspective partial view looking toward a section edge of the transverse seal section of the seal according to FIG. 1, wherein this transverse seal section is arranged on a carrier plate.

In turn, in FIG. 6, in a perspective partial view is shown looking toward a section edge of the carrier plate 9 mounted on the carrier body 3 with a transverse seal section 8 mounted on this plate. In this view, one clearly sees the second lip seal 14 and the third lip seal 16 extending parallel hereto, which are arranged perpendicular to the adjustment direction 5. On the inside of the carrier plate 9, the profile of the fourth lip seal 21 is also visible.

To be seen from the profile of the transverse seal section 8, there are, furthermore, two legs 35, between which a recess 36 is formed, in which a corresponding connecting piece of the carrier plate 9 engages. In this way, a positive-fit connection between the transverse seal section 8 and the carrier plate 9 is produced, which creates a secure hold of the transverse seal section 8 for an adjustment of the carrier body 3 relative to the guide rail in the adjustment direction 5.

LIST OF REFERENCE SYMBOLS

1 Seal
3 Carrier body
4 Recess
5 Adjustment direction
6 Peripheral edge
7 Longitudinal seal section
7' Longitudinal seal section
8 Transverse seal section
8' Transverse seal section
9 Carrier plate
10 Corner region
11 Seal section
12 First lip seal
13 Oil return opening
14 Second lip seal
15 Oil pocket
15' Surface region
16 Third lip seal
18 Region of constant curvature
20 Arc
21 Fourth lip seal
23 Profile of second lip seal
24 Tip
25 Abutting edge
27 Height of first lip seal
29 Profile of first lip seal
30 Abutting edge
33 Connecting piece
34 Connecting piece
Leg
36 Recess
A, A', B, B' Individual parts

The invention claimed is:

1. A carrier body of a hydrostatic linear guide having a given adjustment direction comprising a central recess for holding a longitudinal rail, a seal is arranged along an edge surrounding the recess, the seal comprising a longitudinal seal section extending essentially parallel to the adjustment direction, and with a transverse seal section extending essentially transverse to the adjustment direction a first lip seal with a projecting lip portion extends along the longitudinal seal section and a second lip seal with a projecting lip portion extends along the transverse seal section, and a height of the projecting lip portion of the first lip seal oscillates in a wave shape in the adjustment direction and a height of the projecting lip portion of the second lip seal extends in a straight line in a direction essentially transverse to the adjustment direction.

2. The carrier body according to claim 1, wherein the height of the projecting lip portion of the first lip seal oscillates in the shape of a sine wave.

3. The carrier body according to claim 1, wherein the transverse seal section comprises a third lip seal with a projection lip portion, which extends essentially parallel to the second lip seal.

4. The carrier body according to claim 1, wherein at least one of the first or the second lip seal has a profile with one end extending to a tip perpendicular to a longitudinal direction thereof.

5. The carrier body according to claim 1, wherein the first and the second lip seals have a uniform profile.

6. The carrier body according to claim 1, wherein at least one of the lip portions of first or the second lip seals is made from a material that has increased stiffness relative to a remainder of a material of the seal.

7. The carrier body according to claim 6, wherein at least one of the first or the second lip seals is reinforced with a carrier material, made from a metal or a plastic.

8. The carrier body according to claim 1, wherein at least one of the longitudinal seal sections or the transverse seal section comprise a positive-fit or non-positive fit connection element to a component of the linear guide.

9. The carrier body according to claim 1, wherein the seal is produced in several parts, and individual parts of the seal are connected to each other rigidly at an abutting edge.

10. The carrier body according to claim 9, wherein the abutting edges extend at an angle relative to the longitudinal direction of the lip seals or have a step-shaped construction.

11. The carrier body according to claim 9, wherein the abutting edges are each arranged in the longitudinal seal sections.

12. The carrier body according to claim 1, wherein a fourth lip seal is included for sealing relative to a component of the linear guide in an installed state.

* * * * *